(12) United States Patent
Sigler et al.

(10) Patent No.: US 11,524,358 B2
(45) Date of Patent: Dec. 13, 2022

(54) MECHANICAL PERFORMANCE OF AL-STEEL WELD JOINTS

(71) Applicant: GM GLOBAL TECHNOLOGY OPERATIONS LLC, Detroit, MI (US)

(72) Inventors: David R. Sigler, Shelby Township, MI (US); Amberlee S. Haselhuhn, Troy, MI (US); Blair E. Carlson, Ann Arbor, MI (US); Michael J. Karagoulis, Okemos, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 1072 days.

(21) Appl. No.: 16/183,453

(22) Filed: Nov. 7, 2018

(65) Prior Publication Data
US 2020/0139480 A1  May 7, 2020

(51) Int. Cl.
*B23K 11/11* (2006.01)
*F16B 5/08* (2006.01)
(Continued)

(52) U.S. Cl.
CPC ............... *B23K 11/11* (2013.01); *B23K 11/20* (2013.01); *F16B 5/08* (2013.01); *B23K 2103/04* (2018.08); *B23K 2103/10* (2018.08)

(58) Field of Classification Search
CPC combination set(s) only.
See application file for complete search history.

(56) References Cited

U.S. PATENT DOCUMENTS

| | | | |
|---|---|---|---|
| 5,302,797 A * | 4/1994 | Yasuyama | B23K 11/185 219/118 |
| 2003/0189082 A1* | 10/2003 | Dockus | F28F 21/084 228/56.3 |

(Continued)

FOREIGN PATENT DOCUMENTS

| | | | | |
|---|---|---|---|---|
| CN | 1676264 A | * | 10/2005 | B23K 11/20 |
| DE | 102012020223 A1 | * | 4/2014 | B23K 11/20 |

(Continued)

OTHER PUBLICATIONS

Lu et al., "Process Optimization for Dissimilar Metal Joining of Aluminum to Steel by Ultrasonic Plus Resistance Spot Welding", Oct. 17-18, 2018, Sheet Metal Welding Conference XVIII, Livonia, MI. pp. 1-17 (Year: 2018).*

(Continued)

*Primary Examiner* — Tu B Hoang
*Assistant Examiner* — Vy T Nguyen
(74) *Attorney, Agent, or Firm* — Vivacqua Crane PLLC (57) ABSTRACT

A method of resistance spot welding a workpiece stack-up that includes a steel workpiece and an aluminum workpiece includes adhering an aluminum patch to faying surface of a steel workpiece, positioning an aluminum workpiece over the aluminum patch and the steel workpiece to assemble a workpiece stack-up, passing an electric current through the workpiece stack-up to create a molten aluminum weld pool, and terminating passage of the electric current to solidify the molten aluminum weld pool into a weld joint that bonds the steel and aluminum workpieces together through the aluminum patch. A workpiece stack-up having a weld joint that bonds an aluminum workpiece and a steel workpiece together through an aluminum patch is also disclosed. The weld joint establishes a bonding interface with the faying surface of the steel workpiece, and the aluminum patch is (Continued)

adhered to the faying surface of the steel workpiece around the weld joint.

11 Claims, 3 Drawing Sheets

(51) Int. Cl.
  *B23K 11/20* (2006.01)
  *B23K 103/10* (2006.01)
  *B23K 103/04* (2006.01)

(56) References Cited

U.S. PATENT DOCUMENTS

| | | | | |
|---|---|---|---|---|
| 2014/0360986 A1* | 12/2014 | Sigler | ............ | B23K 11/34 219/91.2 |
| 2017/0291246 A1* | 10/2017 | Sigler | ............ | B23K 11/20 |
| 2017/0291247 A1* | 10/2017 | Sigler | ............ | B23K 11/185 |
| 2017/0297134 A1* | 10/2017 | Sigler | ............ | B23K 35/002 |
| 2017/0297135 A1* | 10/2017 | Sigler | ............ | B23K 11/20 |
| 2017/0297136 A1* | 10/2017 | Brown | ............ | C22C 38/04 |
| 2017/0297137 A1* | 10/2017 | Perry | ............ | C22C 9/00 |
| 2017/0297138 A1* | 10/2017 | Sigler | ............ | B23K 11/115 |

FOREIGN PATENT DOCUMENTS

| | | | |
|---|---|---|---|
| EP | 3366406 A1 * | 8/2018 | ......... B23K 11/06 |
| JP | H0639558 A | 2/1994 | |
| JP | 2015066588 A * | 4/2015 | |

OTHER PUBLICATIONS

Lu et al., "Process Optimization for Dissimilar Metal Joining of Aluminum to Steel by Ultrasonic Plus Resistance Spot Welding," Sheet Metal Welding Conference XVIII, (2018) pp. 1-17.

* cited by examiner

FIG. 9

MECHANICAL PERFORMANCE OF AL-STEEL WELD JOINTS

INTRODUCTION

A number of industries utilize resistance spot welding to join together two or more metal workpieces during the manufacture of a larger assembly. Resistance spot welding has long been employed to fusion weld together similarly-composed metal workpieces such as a stack-up of two or more steel workpieces or two or more aluminum workpieces. More recently, however, resistance spot welding practices have been developed that enable dissimilar metal workpieces such as a steel workpiece and an overlapping aluminum workpiece to be bonded together. The ability to resistance spot weld such stack-ups of dissimilar metal workpieces as they are presented for welding provides the automobile industry, for example, with more flexibility to utilize both ferrous and non-ferrous metal within the vehicle structure at specifically tailored locations without significantly increasing overall manufacturing complexity. Other industries besides the automotive industry may also benefit from the ability to reliably resistance spot weld workpiece stack-ups that include dissimilar metal workpieces. These other industries may include the aerospace, marine, railway, building construction, and industrial equipment industries, to name but a few.

Resistance spot welding is a metal joining process that relies on the momentary passage of an electric current through overlapping metal workpieces to heat and join the workpieces at a weld location. To carry out such a welding process, two opposed welding electrodes are clamped at aligned spots on opposite sides of a workpiece stack-up and an electric current is passed through the two or more overlapping metal workpieces between the opposed electrode weld faces. Resistance to the flow of this electric current generates heat within the metal workpieces and at their faying interface. The resistively-generated heat is rapidly created and sufficiently concentrated enough to melt one or more of the overlapping metal workpieces. When the workpiece stack-up includes a steel workpiece and an adjacent overlapping aluminum workpiece, the heat generated at the faying interface of those two workpieces and within the more electrically and thermally resistive steel workpiece creates a molten aluminum weld pool within the aluminum workpiece. The molten aluminum weld pool does not consume the faying interface between the steel and aluminum workpieces, but, rather, spreads and wets the adjacent faying surface of the steel workpiece. Eventually, upon cooling, the molten aluminum weld pool solidifies into weld joint that interfacially bonds or brazes the steel and aluminum workpieces together.

When adjacent steel and aluminum workpieces are joined using resistance spot welding, the elevated temperature attained in the steel workpiece and the exposure of the steel workpiece to the molten aluminum weld pool causes Fe—Al intermetallic compounds to form. The solidified weld joint thus generally includes an Fe—Al intermetallic layer disposed along and contiguous with the faying surface of the adjacent steel workpiece. This layer is hard and brittle, especially compared to the softer and tougher aluminum nugget portion of the weld joint, which penetrates into and oftentimes through the aluminum workpiece and constitutes the overwhelming majority of the joint. If stress is transferred to the Fe—Al intermetallic layer when either of the steel or the aluminum workpieces, or both, is deformed or the weld joint is otherwise subjected to loading, the brittle Fe—Al intermetallic layer may crack and fracture, thereby leading to interfacial failure of the joint and corresponding low strength properties—most notably in both peel and cross-tension tests—despite the fact that the joint may otherwise be structurally sound. Resistance spot welding techniques that can help isolate and protect the Fe—Al intermetallic layer while also potentially mitigating oxide film defects would, therefore, help reliably produce weld joints with good mechanical properties.

SUMMARY OF THE DISCLOSURE

A method of resistance spot welding a workpiece stack-up that includes a steel workpiece and an aluminum workpiece according to one embodiment of the present disclosure comprises several steps. In one step, an aluminum patch is adhered to a faying surface of a steel workpiece. In another step, an aluminum workpiece is positioned over the aluminum patch and the steel workpiece to assemble a workpiece stack-up in which the aluminum patch is disposed between a faying surface of the aluminum workpiece and the faying surface of the steel workpiece. The workpiece stack-up has a first side and an opposite second side. The first side is provided by an aluminum workpiece surface and the second side is provided by a steel workpiece surface. In another step, a weld face of a first welding electrode is pressed against the first side of the workpiece stack-up. In still another step, a weld face of a second welding electrode is pressed against the second side of the workpiece stack-up in facial alignment with the weld face of the first welding electrode. In yet another step, an electric current is passed between the weld face of the first welding electrode and the weld face of the second welding electrode to create a molten aluminum weld pool that penetrates through the aluminum patch and into the aluminum workpiece. The molten aluminum weld pool consumes a portion of the aluminum patch to wet an exposed portion of the faying surface of the steel workpiece. In another step, passage of the electric current is terminated so that the molten aluminum weld pool solidifies into a weld joint that bonds the aluminum workpiece to the steel workpiece through the aluminum patch. The weld joint establishes a bonding interface with the exposed portion of the faying surface of the steel workpiece and, additionally, a notch root is created between the aluminum workpiece and the aluminum patch and is displaced away from the faying surface of the steel workpiece.

The aforementioned method may include additional steps or be further defined. For example, the aluminum patch may be comprised of unalloyed aluminum, an aluminum-manganese alloy that includes up to 1.8 wt % manganese, or an aluminum-silicon alloy that includes up to 15 wt % silicon. As another example, the aluminum patch may be an aluminum shim that has a first facial surface and an opposed second facial surface. Adhering the aluminum shim to the steel workpiece may comprise pre-welding the aluminum shim to the steel workpiece to thereby form a supporting weld joint that bonds the aluminum shim to the steel workpiece. The aluminum shim may be comprised of unalloyed aluminum, an aluminum-manganese alloy that includes up to 1.8 wt % manganese, or an aluminum-silicon alloy that includes up to 15 wt % silicon. Still further, the molten aluminum weld pool created by passage of the electric current may penetrate through the supporting weld joint such that, upon solidifying, the resultant weld joint is surrounded by an unconsumed portion of the supporting weld joint. The bonding interface established between the weld joint and the exposed portion of the faying surface of the steel workpiece is surrounded by a bonding interface established between the unconsumed portion of the supporting weld joint and the faying surface of the steel workpiece outside of the weld joint. A notch root may be created between the aluminum shim and the steel workpiece outside of and adjacent to the supporting weld joint.

In various implementations of the aforementioned method, an outer exterior surface of the steel workpiece may constitute the steel workpiece surface at the second side of the workpiece stack-up, and an outer exterior surface of the aluminum workpiece may constitute the aluminum workpiece surface at the first side of the workpiece stack-up. Also, the aluminum patch may be an aluminum coating. Adhering the aluminum coating to the faying surface of the steel workpiece may comprise depositing the aluminum coating onto the faying surface of the steel workpiece. In another implementation, the aluminum patch may be an aluminum shim that has a first facial surface and an opposed second facial surface, and adhering the aluminum shim to the faying surface of the steel workpiece comprises (1) applying a curable adhesive layer between the second facial surface of the aluminum shim and the faying surface of the steel workpiece, and thereafter (2) curing the curable adhesive layer to adhesively bond the second facial surface of the aluminum shim to the faying surface of the steel workpiece after terminating passage of the electric current to solidify the molten aluminum weld pool into the weld joint that bonds the aluminum workpiece to the steel workpiece.

A method of resistance spot welding a workpiece stack-up that includes a steel workpiece and an aluminum workpiece according to another embodiment of the present disclosure comprises several steps. In one step, an aluminum shim is pre-welded to a steel workpiece to form a supporting weld joint within the aluminum shim that establishes a bonding interface with a faying surface of the steel workpiece. In another step, an aluminum workpiece is positioned over the aluminum shim and the steel workpiece to assemble a workpiece stack-up in which the aluminum shim is disposed between a faying surface of the aluminum workpiece and the faying surface of the steel workpiece. The workpiece stack-up has a first side and an opposite second side. The first side is provided by an aluminum workpiece surface and the second side is provided by a steel workpiece surface. In another step, a weld face of a first welding electrode is pressed against the first side of the workpiece stack-up. In still another step, a weld face of a second welding electrode is pressed against the second side of the workpiece stack-up in facial alignment with the weld face of the first welding electrode. In yet another step, an electric current is passed between the weld face of the first welding electrode and the weld face of the second welding electrode to create a molten aluminum weld pool that penetrates through the aluminum shim within the supporting weld joint and into the aluminum workpiece. The molten aluminum weld pool consumes a portion of the supporting weld joint, including a portion of the bonding interface of the supporting weld joint, to wet an exposed portion of the faying surface of the steel workpiece. In another step, passage of the electric current is terminated so that the molten aluminum weld pool solidifies into a weld joint that bonds the aluminum workpiece to the steel workpiece through the aluminum shim. The weld joint is surrounded by an unconsumed portion of the supporting weld joint and establishes a bonding interface with the exposed portion of the faying surface of the steel workpiece. Additionally, a notch root is created between the aluminum workpiece and the aluminum shim and is displaced away from the faying surface of the steel workpiece.

The method of the aforementioned embodiment may include additional steps or be further defined. For instance, pre-welding the aluminum shim to the steel workpiece may include several steps. In one step, the aluminum shim is placed against the faying surface of the steel workpiece. The aluminum shim has a first facial surface and a second facial surface, with the second facial surface contacting the faying surface of the steel workpiece. In another step, a weld face of a first welding electrode is pressed against the first facial surface of the aluminum shim. In still another step, a weld face of a second welding electrode is pressed against an outer exterior surface of the steel workpiece in facial alignment with the weld face of the first welding electrode. In yet another embodiment, an electric current is passed between the weld face of the first welding electrode and the weld face of the second welding electrode and through the steel workpiece and the aluminum shim to create a molten aluminum weld pool within the aluminum shim. The molten aluminum weld pool created within the aluminum shim wets the faying surface of the steel workpiece. And, in another step, passage of the electric current is terminated to allow the molten aluminum weld pool created within the aluminum shim to solidify into the supporting weld joint.

The aluminum shim employed in the aforementioned method may be comprised of unalloyed aluminum, an aluminum-manganese alloy that includes up to 1.8 wt % manganese, or an aluminum-silicon alloy that includes up to 15 wt % silicon. Also, a notch root may be created between the aluminum shim and the steel workpiece outside of and adjacent to the supporting weld joint. Still further, in various implementations, an outer exterior surface of the steel workpiece may constitute the steel workpiece surface at the second side of the workpiece stack-up, and an outer exterior surface of the aluminum workpiece may constitute the aluminum workpiece surface at the first side of the workpiece stack-up.

A workpiece stack-up according to still another embodiment of the present disclosure comprises several features. The workpiece stack-up includes a steel workpiece having a faying surface, an aluminum workpiece that overlaps the steel workpiece and has a faying surface that confronts the faying surface of the steel workpiece, an aluminum patch disposed between the steel workpiece and the aluminum workpiece, and a weld joint that bonds the aluminum and steel workpieces together. The weld joint establishes a bonding interface with the faying surface of the steel workpiece and extends through the aluminum patch and into the aluminum workpiece. Moreover, the aluminum patch is adhered to the faying surface of the steel workpiece outside of and around the weld joint. In one implementation, the aluminum patch is an aluminum shim that is welded to the steel workpiece by an unconsumed portion of a supporting weld joint that extends into the aluminum shim and surrounds the weld joint. The unconsumed portion of the supporting weld joint establishes a bonding interface with the faying surface of the steel workpiece that surrounds the bonding interface established between the weld joint and an exposed portion of the faying surface of the steel workpiece.

DETAILED DESCRIPTION

When resistance spot welding a workpiece stack-up that includes a steel workpiece and an opposed adjacent aluminum workpiece, a weld joint that bonds or brazes those two adjacent workpieces together may be provided with more consistently-reliable mechanical properties by using an intervening aluminum patch to create a notch root between the aluminum patch and the overlying aluminum workpiece. This notch root surrounds the weld joint and is displaced away from the faying surface of the steel workpiece. And, as will be further explained below, provisions can be made to divert stress to the notch root established between the aluminum patch and the aluminum workpiece whenever the weld joint is loaded, which, in turn, shields the Fe—Al intermetallic layer formed along a bonding interface of the weld joint and the steel workpiece from some or all of that stress to help avoid facture of the Fe—Al intermetallic layer and premature joint failure. The aluminum patch also enables a wide variety of aluminum workpieces to be joined to the steel workpiece through the aluminum patch than might otherwise be practical in the absence of the patch.

The aluminum patch is adhered to a faying surface of the steel workpiece that facially opposes the aluminum workpiece in the assembled and welded workpiece stack-up. The aluminum patch may, for example, be an aluminum shim that is bonded to the faying surface of the steel workpiece by a supporting weld joint formed during pre-welding. In another example, the aluminum patch may be an aluminum shim that is adhesively bonded to the faying surface by a cured adhesive layer that is crosslinked after spot welding. In yet another example, the aluminum patch may be an aluminum coating that is metallurgically bonded to the faying surface of the steel workpiece. Coating processes such as thermal spraying and cold spraying can be used to deposit the aluminum coating. By adhering the aluminum patch to the steel workpiece either before, during, or after spot welding the workpiece stack-up, the weld joint that results from the spot welding operation is surrounded by an unconsumed portion of the patch that is adhered to the faying surface of the steel workpiece. This unconsumed portion of the aluminum patch isolates and protects the Fe—Al intermetallic layer of the weld joint and diverts any stress applied to the joint towards the notch root established between the aluminum patch and the overlying aluminum workpiece. Diverting any such stress towards the notch root established between the aluminum patch and the aluminum workpiece is more preferred since the notch root is displaced from and generally does not induce cracking into the Fe—Al intermetallic layer of the weld joint.

A number of workpiece stack-up configurations may be resistance spot welded with the aid of the aluminum patch in accordance with the present disclosure. For example, the workpiece stack-up may include only a steel workpiece and an adjacent overlapping aluminum workpiece, as far as the number of workpieces are concerned, with the aluminum patch being disposed between the confronting faying surfaces of the steel and aluminum workpieces. As another example, the workpiece stack-up may include a steel workpiece and a plurality of aluminum workpieces so long as the multiple aluminum workpieces are positioned next to each other, or it may include an aluminum workpiece and a plurality of steel workpiece so long as the multiple steel workpieces are positioned next to each other. In either of these scenarios, the workpiece stack-up may be a "3T" stack-up that includes a steel workpiece and two aluminum workpieces (steel-Al—Al) or an aluminum workpiece and two steel workpieces (Al-steel-steel), or the stack-up may be a "4T" stack-up that includes a steel workpiece and three aluminum workpieces (steel-Al—Al—Al), an aluminum workpiece and three steel workpieces (Al-steel-steel-steel), or two steel workpieces and two aluminum workpieces (steel-steel-Al—Al). When more than one aluminum workpiece and/or more than one steel workpiece is present in the stack-up, the aluminum patch is disposed between the adjacent steel and aluminum workpieces the overlap and oppose each another.

Referring now to FIGS. 1-5, a first embodiment of a workpiece stack-up 10 according to practices of the present disclosure is described. The workpiece stack-up 10, which is shown in its assembled state in FIG. 2, includes a steel workpiece 12, an aluminum workpiece 14 that overlaps and opposes the steel workpiece 12, and an aluminum patch 16 disposed between the steel workpiece 12 and the aluminum workpiece 14. And while the steel workpiece 12 and the aluminum workpiece 14 are shown here in the context of a "2T" stack-up for demonstrative purposes, it should be understood that one or more additional steel workpieces may be included in the stack-up 10 next to the steel workpiece 12 (away from the aluminum workpiece 14) and/or one or more aluminum workpieces may be included in the stack-up 10 next to the aluminum workpiece 14 (away from the steel workpiece 12). The additional steel and/or aluminum workpiece(s) do not necessarily affect the relationship between the opposed steel and the aluminum workpieces 12, 14 that are bonded together by a weld joint that extends from the steel workpiece 12 and into the aluminum workpiece 14 through the aluminum path 16 as will be further explained below. Accordingly, the following description as presented in the context of the illustrated "2T" workpiece stack-up is equally applicable to stack-ups that include additional steel and/or aluminum workpiece(s) positioned outboard of the confronting steel and aluminum workpieces 12, 14 even though such additional workpieces are not shown.

The steel workpiece 12 includes a steel substrate from any of a wide variety of strengths and grades that is either coated or uncoated. The steel substrate may be a hot-rolled or cold-rolled sheet metal layer and may be composed of steel such as low carbon (mild) steel, interstitial-free steel, bake-hardenable steel, high-strength low-alloy (HSLA) steel, dual-phase (DP) steel, complex-phase (CP) steel, martensitic (MART) steel, transformation induced plasticity (TRIP) steel, twining induced plasticity (TWIP) steel, and boron steel such as when the steel workpiece 12 includes press-hardened steel (PHS). Preferred compositions of the steel substrate include mild steel, dual phase steel, and boron steel used in the manufacture of press-hardened steel. Those three types of steel have ultimate tensile strengths that, respectively, range from 150 MPa to 500 MPa, from 500 MPa to 1100 MPa, and from 1200 MPa to 1800 MPa. If coated, the steel substrate preferably includes a surface layer of zinc (e.g., hot-dip galvanized), a zinc-iron alloy (e.g., galvanneal or electrodeposited), a zinc-nickel alloy (e.g., electrodeposited), nickel, aluminum, an aluminum-magnesium alloy, an aluminum-zinc alloy, or an aluminum-silicon alloy, any of which may have a thickness of up to 50 µm on each side of the steel substrate. Taking into account the thickness of the steel substrate and any surface layer that may be present, the steel workpiece 12 has a thickness 121 that ranges from 0.3 mm and 6.0 mm, or more narrowly from 0.6 mm to 2.5 mm. Any additional steel workpieces included in the stack-up share the same general description.

The aluminum workpiece 14 includes an aluminum substrate that is either coated or uncoated. The aluminum substrate may be composed of unalloyed aluminum or an aluminum alloy that includes at least 85 wt % aluminum. Some notable aluminum alloys that may constitute the coated or uncoated aluminum substrate are an aluminum-magnesium alloy, an aluminum-silicon alloy, an aluminum-magnesium-silicon alloy, and an aluminum-zinc alloy. If coated, the aluminum substrate may include a surface layer comprised of a refractory oxide material such as the native oxide layer that forms naturally when the aluminum substrate is exposed to air and/or an oxide layer created during exposure of the aluminum substrate to elevated temperatures during manufacture, e.g., a mill scale. The refractory oxide material is typically comprised of aluminum oxide compounds and possibly other oxide compounds as well, such as magnesium oxide compounds if, for example, the aluminum substrate is an aluminum-magnesium alloy. The aluminum substrate may also be coated with a layer of zinc, tin, or a metal oxide conversion coating as described in US Pat. Pub. No. 2014/0360986. The surface layer may have a thickness ranging from 1 nm to 10 µm depending on its composition and may be present on each side of the aluminum substrate. Taking into account the thickness of the aluminum substrate and any surface layer that may be present, the aluminum workpiece 14 has a thickness 141 that ranges from 0.3 mm to about 6.0 mm, or more narrowly from 0.5 mm to 3.0 mm.

The aluminum substrate of the aluminum workpiece 14 may be provided in wrought or cast form. For example, the aluminum substrate may be composed of a 5xxx ("aluminum-magnesium alloy"), 6xxx ("aluminum-magnesium-silicon"), or 7xxx ("aluminum-zinc alloy") series wrought aluminum alloy sheet layer, extrusion, forging, or other worked article. Alternatively, the aluminum substrate may be composed of a 4xx.x, 5xx.x, or 7xx.x series aluminum alloy casting. Some more specific kinds of aluminum alloys that may constitute the aluminum substrate include, but are not limited to, AA5754 and AA5182 aluminum-magnesium alloy, AA6111 and AA6022 aluminum-magnesium-silicon alloy, AA7003 and AA7055 aluminum-zinc alloy, and Al-10Si—Mg aluminum die casting alloy. The aluminum substrate may further be employed in a variety of tempers including annealed (O), strain hardened (H), and heat treated (T), if desired. The term "aluminum workpiece" as used herein thus encompasses unalloyed aluminum and a wide variety of aluminum alloys, whether coated or uncoated, in different spot-weldable forms including wrought sheet layers, extrusions, forgings, etc., as well as castings. Any additional aluminum workpieces included in the stack-up share the same general description.

Figure 1:
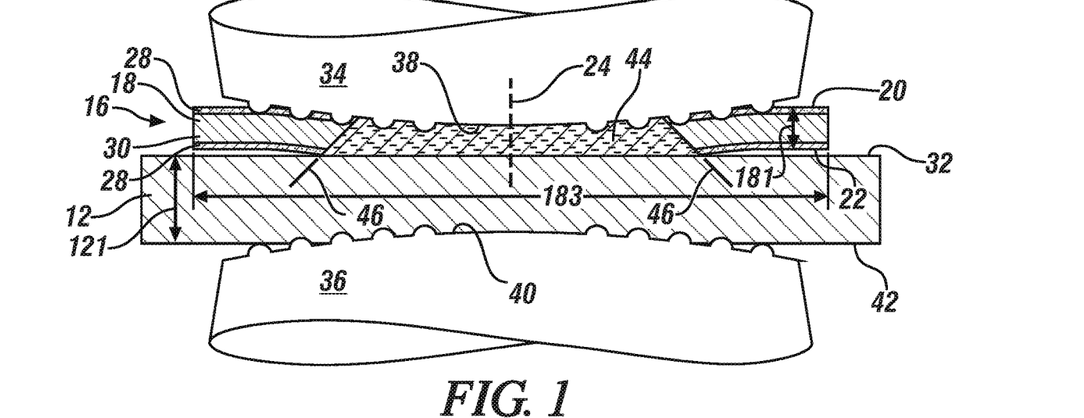
FIG. 1 is an elevated cross-sectional view of a steel workpiece and an aluminum patch in the form of an aluminum shim during pre-welding of the shim to the steel workpiece by a pair of welding electrodes according to one embodiment of the present disclosure.

In this particular embodiment, and referring now to FIG. 1, the aluminum patch 16 is an aluminum shim 18 that is pre-welded to the steel workpiece 12. The aluminum shim 18 has a first facial surface 20 and an opposed second facial surface 22. The first and second facial surfaces 20, 22 define a thickness 181 of the shim 18 that ranges from 0.1 mm to 2.0 mm or, more narrowly, from 0.2 mm to 1.0 mm. Additionally, the aluminum shim 18 has a width 183 arranged perpendicular to its thickness 181 of at least 10 mm, or more preferably at least 15 mm, in all directions passing through a vertical weld line 24 of the shim 18 that extends parallel to the thickness 181 of the shim 18; that is, each of the first facial surface 20 and the second facial surface 22 of the aluminum shim 18 should extend beyond an imaginary circle that has a radius of 5 mm, or more preferably 7.5 mm, and is oriented within a plane of the shim 18 perpendicular to the shim thickness 181 and centered on the vertical weld line 24 of the shim 18. The aluminum shim 18 is preferably rectangular, circular, or ovular in shape while satisfying the minimum width conditions just mentioned. Each of the first and second facial surfaces 20, 22 of the aluminum shim 18 is delineated by a refractory oxide layer 28 that coats an underlying bulk aluminum substrate 30.

The aluminum substrate 30 of the aluminum shim 18 is preferably composed of a low-strength aluminum—i.e., an aluminum having a yield strength of less than 100 MPa or more preferably less than 85 MPa in the annealed (O-temper) state—such as an unalloyed aluminum comprised of 99 wt % or greater aluminum, with the remainder being impurities, or an aluminum-manganese alloy that includes aluminum as the main alloy constituent plus up to 1.8 wt % manganese or an aluminum-silicon alloy that includes aluminum as the main alloy constituent plus up to 15 wt % silicon. The unalloyed aluminum may be a 1xxx series unalloyed aluminum. The aluminum-manganese alloy may be a 3xxx series wrought aluminum alloy sheet layer that comprises aluminum and 0.3 wt % to 1.8 wt % manganese plus other optional alloying elements including one or more of 0 wt % to 0.3 wt % copper, 0 wt % to 0.7 wt % iron, or 0 wt % to 0.6 wt % silicon. The aluminum-manganese alloy may also include magnesium in an amount up to 0.5 wt %, or more narrowly up to 0.2 wt %, although in preferred implementations magnesium is excluded from the alloy. The aluminum-silicon alloy may be a 4xxx series wrought aluminum alloy sheet layer that comprises aluminum and 1 wt % to 15 wt % silicon plus other optional alloying elements including one or more of 0 wt % to 0.25 wt % manganese or 0 wt % to 0.25 wt % magnesium.

Due to the low level or absence of readily-oxidizable elements such as magnesium, the refractory oxide layers 28 derived from the low-strength aluminums noted above are typically relatively thin, which provides the aluminum shim 18 with a relatively low contact resistance compared to other aluminums such as 5xxx and 6xxx series aluminum alloys. Notably, each of the refractory oxide layers 28 is comprised primarily of aluminum oxide and has a thickness of 5 nm to 100 nm, and the aluminum shim 18 has a contact resistance of less than 300 $\mu\Omega$ (micro-ohms), or more narrowly less than 100 $\mu\Omega$, as measured between two coupons of the aluminum shim material. The contact resistance is measured by placing two coupons of the aluminum shim material into interfacial contact, typically at least 400 mm$^2$ of interfacial contact, and then clamping the adjacent contacting coupons between a pair of welding electrodes at a high force of 1100 lb. Each of the welding electrodes includes a series of protruding ringed ridges on its weld face. An electrical current is then passed through the coupons without initiating melting of the coupons until the contact resistance stabilizes.

The aluminum shim 18 is pre-welded to the steel workpiece 12 by resistance spot welding. Such pre-welding involves placing the aluminum shim 18 against a faying surface 32 of the steel workpiece 12 so that, as applicable here, the second facial surface 22 of the aluminum shim 18 contacts the faying surface 32 of the steel workpiece 12 directly without the aid of an intervening adhesive layer. The steel workpiece 12 and the aluminum shim 18 are then clamped between a first welding electrode 34 and an opposed second welding electrode 36. Specifically, a weld face 38 of the first welding electrode 34 is pressed against the first facial surface 20 of the aluminum shim 18 and a weld face 40 of the second welding electrode 36 is pressed against an outer exterior surface 42 of the steel workpiece 12. And, when pressed against their respective surfaces 20, 42 of the aluminum shim 18 and the steel workpiece 12, the weld faces 38, 40 of the first and second welding electrodes 34, 36 are facially aligned with one another along the vertical weld line 24 of the aluminum shim 18 within acceptable manufacturing tolerances. Each of the weld faces 38, 40 of the first and second welding electrodes 34, 36 may have any of a wide variety of weld face geometries. Each weld face 38, 40 may, for example, and as shown here, include a series of two to six ringed ridges that protrudes outwardly from a base surface of the weld face 38, 40 as disclosed in any of U.S. Pub. Nos. 2013/0200048, 2015/0083694, 2017/0225262, and 2018/0234302, the entire contents of which are incorporated herein by reference. As another example, each of the weld faces 38, 40 may be microtextured as disclosed in U.S. Pub. No. 2017/0304928, the entire contents of which are incorporated herein by reference.

A first electric current is passed between the weld faces 38, 40 of the first and second welding electrodes 34, 36 and through the aluminum shim 18 and the steel workpiece 12. The first electric current heats the more thermally and electrically resistive steel workpiece 12, which causes the aluminum shim 18 to begin to melt at the second facial surface 22 of the shim 18. As passage of the first electric current continues, a molten aluminum weld pool 44 is created within the aluminum shim 18, as is shown in FIG. 1. The molten aluminum weld pool 44 grows laterally along the faying surface 32 of the steel workpiece 12 and penetrates into the aluminum shim 18 towards the first facial surface 20 of the shim 18 to a depth that ranges from 20% to 100% of the thickness 181 of the shim 18. Indeed, the weld schedule that controls passage of the first electric current can be designed to grow the molten aluminum weld pool 44 so that it tapers inwardly within the aluminum shim 18 towards the first facial surface 20 away from the faying surface 32 of the steel workpiece 12 as identified generally by dashed lines 46. The first electric current may be a continuous square wave, pulsed, or it may have some other varying waveform. One example of a suitable weld schedule for the passage of electric current during pre-welding of the aluminum shim 18 to the steel workpiece 12 involves the multi-stage current profiles described in U.S. Pat. No. 10,058,949 and U.S. Pub. No. 2017/0106466, the entire contents of which are incorporated herein by reference.

The molten aluminum weld pool 44 spreads along and wets the faying surface 32 of the steel workpiece 12. Upon terminating the passage of the first electric current, the molten aluminum weld pool 44 solidifies into a supporting weld joint 48 that bonds the aluminum shim 18 to the steel workpiece 12. The supporting weld joint 48, in particular, establishes a bonding interface 50 with the faying surface 32 of the steel workpiece 12 and includes an aluminum weld nugget 52 and an Fe—Al intermetallic layer 54, as shown best in FIG. 2. The aluminum weld nugget 52 is comprised of resolidified aluminum from the aluminum shim 18 and extends into the aluminum shim 18 towards the first facial surface 20 of the shim 18 to a depth that ranges from 20% to 100% of the thickness 181 of the shim 18. The Fe—Al intermetallic layer 54 is situated between the aluminum weld nugget 52 and the faying surface 32 of the steel workpiece 12 and is contiguous with the bonding interface 50 established by supporting weld joint 48. The Fe—Al intermetallic layer 54 may include FeAl$_3$ compounds, Fe$_2$Al$_5$ compounds, and possibly other Fe—Al intermetallic compounds, and typically has a thickness that ranges from 0.5 μm to 10 μm. The supporting weld joint 48 has a diameter 481 that may range from 5 mm to 15 mm, or more narrowly from 6 mm to 10 mm at the bonding interface 50, and preferably tapers inwardly in the same manner as the molten aluminum weld pool 44.

The supporting weld joint 48 is broad and has good bonding strength with the steel workpiece 12 due, at least in part, to the composition and thickness 181 of the aluminum shim 18. The composition of the aluminum substrate 30 of the aluminum shim 18, for instance, is responsible for both its low, elevated temperature strength and its clean and relatively thin refractory oxide layers 28. The resistance to oxidation exhibited by the shim 18 is provided by the low level of readily-oxidizing elements, such as magnesium, in the bulk aluminum substrate 30. By avoiding or at least limiting such readily-oxidizing elements in the bulk aluminum substrate 30, the formation of additional oxides (e.g., magnesium oxides) that tend to thicken refractory oxide layers 28 is inhibited. The combination of the low strength of the aluminum substrate 30—the low strength enables deformation of the shim 18 under load—and the thinner refractory oxide layers 28 results in rapid breakdown of oxide layers 28 during current flow, thus reducing contact resistance of the shim 18 and allowing the molten aluminum weld pool 44 that transforms into the supporting weld joint 48 to be created with less heat input. And, the lower heat input required to create the molten aluminum weld pool 44 curbs the formation and growth of the Fe—Al intermetallic layer 54 when combined with the early elimination of the refractory oxide film layer 28, particularly the oxide layer 28 that contacts the faying surface 32 of the steel workpiece 12, the limited thickness 181 of the aluminum shim 18, and the composition of the shim 18 which may contain elements (e.g., Si and/or Mn) that inhibit the growth of Fe—Al intermetallic compounds. The susceptibility of the supporting weld joint 48 to interfacial fracture when subjected to loading is thus abated as much as possible. To that end, the good strength of the supporting weld joint 48 and the broad integrity of the bonding interface 50 between the joint 48 and the faying surface 28 of the steel workpiece 12 enables the supporting weld joint 48 to protect a subsequently-formed weld joint, as described below, between the steel workpiece 12 and a more automotive grade aluminum workpiece 14.

Figure 2:
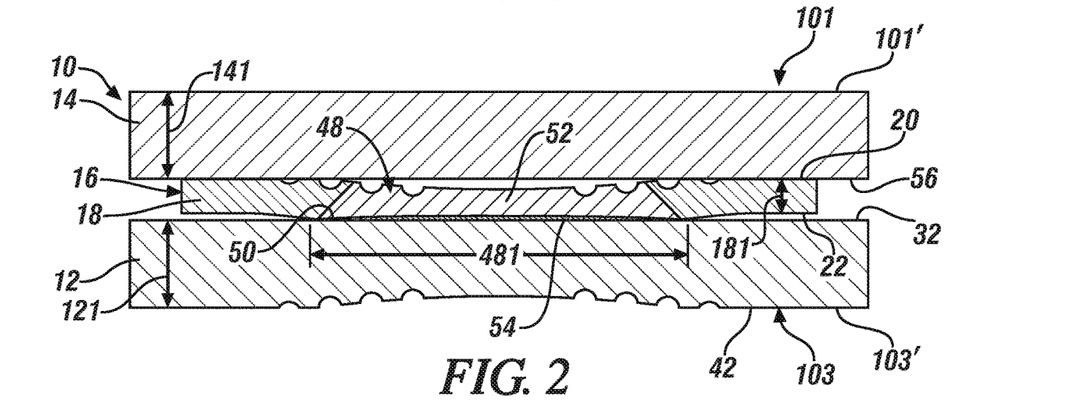
FIG. 2 is an elevated cross-sectional view of the steel workpiece and the aluminum shim depicted in FIG. 1, after being pre-welded together, along with an aluminum workpiece positioned relative to the steel workpiece such that the aluminum shim is disposed between the aluminum workpiece and the steel workpiece to provide a workpiece stack-up according to one embodiment of the present disclosure.

After the aluminum shim 18 has been pre-welded to the steel substrate 12, the workpiece stack-up 10 is assembled by positioning the aluminum workpiece 14 against the aluminum shim 18 such that the aluminum shim 18 is disposed between the aluminum workpiece 14 and the steel workpiece 12, as shown in FIG. 2. Any suitable fixturing device can be employed to hold the workpiece stack-up 10 together. In this particular embodiment, a faying surface 56 of the aluminum workpiece 14 is placed into contact with the first facial surface 20 of the aluminum shim 18. In that regard, while the aluminum shim 18 is sandwiched between the two workpieces 12, 14, the faying surface 56 of the aluminum workpiece 14 overlaps and confronts the faying surface 32 of the steel workpiece 12. Additionally, when assembled, the workpiece stack-up 10 has a first side 101 and a second side 103. The first side 101 of the workpiece stack-up 10 is provided by an aluminum workpiece surface 101' and the second side 103 is provided by a steel workpiece surface 103'. The two sides 101, 103 of the workpiece stack-up 10 are accessible to a pair of welding electrodes at a weld location 58 (FIG. 3) that is spanned by the aluminum shim 18.

The steel workpiece 12 and the aluminum workpiece 14 are then welded together through the aluminum shim 18 by resistance spot welding. To that end, and referring now to FIG. 3, the workpiece stack-up 10 is clamped between a first welding electrode 60 and an opposed second welding electrode 62. In so doing, a weld face 64 of the first welding electrode 60 is pressed against the aluminum workpiece surface 101' that provides the first side 101 of the workpiece stack-up 10 and a weld face 66 of the second welding electrode 62 is pressed against the steel workpiece surface 103' that provides the second side 103 of the stack-up 10. The weld faces 64, 66 are facially aligned at the weld location 58. In the "2T" workpiece stack-up embodiment shown in FIGS. 1-5 in which the stack-up 10 includes only the opposed and adjacent steel and aluminum workpieces 12, 14 (as far as the number of workpieces are concerned) that sandwich the aluminum shim 18, an outer exterior surface 68 of the aluminum workpiece 14 constitutes the aluminum workpiece surface 101' and the outer exterior surface 42 of the steel workpiece 12 constitutes the steel workpiece surface 103'. However, in other embodiments that include one or more additional aluminum workpieces and/or one or more additional steel workpieces, an additional aluminum workpiece that overlaps and is positioned outboard of the aluminum workpiece 14 may constitute the aluminum workpiece surface 101', and, separately or at the same time, an additional steel workpiece that overlaps and is positioned outboard of the steel workpiece 12 may constitute the steel workpiece surface 103'.

The first and second welding electrodes 60, 62 employed to spot weld the workpiece stack-up 10 may be the same as the first and second welding electrodes 34, 36 used earlier to pre-weld the aluminum shim 18 to the steel workpiece 12 or they may be different welding electrodes. Preferably, the same electrodes are used to perform both the pre-welding and the welding operations for operational efficiency. As before with the welding electrodes 34, 36 used for pre-welding, each of the weld faces 64, 66 of the first and second welding electrodes 60, 62 here may have a wide variety of weld face geometries. In one specific implementation, as shown here in FIG. 2, each of the weld faces 64, 66 of the first and second welding electrodes 60, 62 may include a series of two to six ringed ridges that protruded outwardly from a base surface of the weld face 64, 66 as disclosed in any of U.S. Pub. Nos. 2013/0200048, 2015/0083694, 2017/0225262, and 2018/0234302. The weld face 64 of the first welding electrode 60 may have a diameter that ranges from 6 mm to 20 mm, or more narrowly from 8 mm to 15 mm, and be convexly domed, and the weld face 66 of the second welding electrode 62 may have a diameter that ranges from 3 mm to 16 mm, or more narrowly from 4 mm to 8 mm, and may also be convexly domed. Each of the first and second welding electrodes 60, 62 (as well as welding electrodes 34, 36) may be constructed from a copper alloy (e.g., CuAr, CuCr, CuCrZr), a tungsten-copper composite, or a dispersion-strengthened copper material such as copper with an aluminum oxide dispersion.

Figure 3:
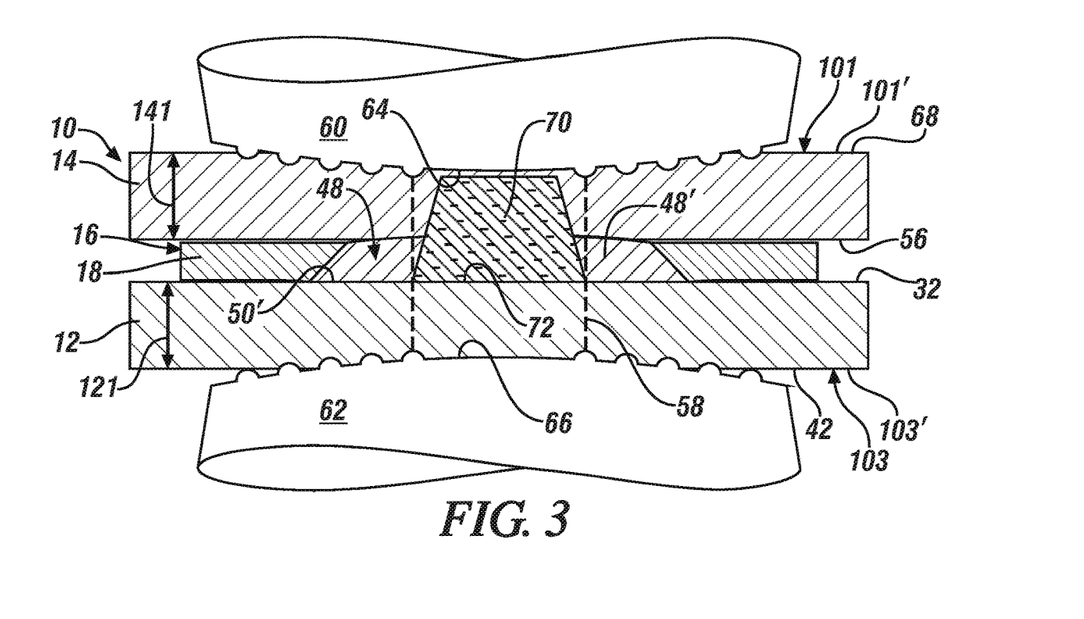
FIG. 3 is an elevated cross-sectional view of the workpiece stack-up depicted in FIG. 2 along with a pair of welding electrodes that are passing an electric current through the workpiece stack-up during of resistance spot welding of the stack-up to thereby form a weld joint that bonds the steel and aluminum workpieces together through the aluminum shim according to one embodiment of the present disclosure.

After the weld faces 64, 66 of the first and second welding electrodes 60, 62 are pressed against their respective sides 101, 103 of the workpiece stack-up 10, a second electric current is passed between the weld faces 64, 66 and through the steel workpiece 12, the aluminum workpiece 14, and the intervening aluminum shim 18, as shown in FIG. 3. The second electric current may be constant or pulsed over time, or some combination of the two, and typically has a current level that ranges from 5 kA rms (root mean squared) and 50 kA rms and lasts for a total duration of 50 ms to 5000 ms or, more narrowly, for a total duration of 200 ms to 2000 ms. As a few specific examples, the schedule of the second electric current may be in the nature of the multi-step weld schedule disclosed in U.S. Pat. No. 10,058,949 and U.S. Pub. No. 2017/0106466, or another weld schedule that is suitable for the workpiece stack-up 10. As the second electric current flows between the first and second weld faces 64, 66 of the first and second welding electrodes 60, 62, the more thermally and electrically resistive steel workpiece 12 heats quite rapidly. This heat is transferred to the aluminum workpiece 14 through the aluminum shim 18 and causes the aluminum workpiece 14 and the supporting weld joint 48 to melt. The melting of the aluminum workpiece 14 and the supporting weld joint 48 creates a molten aluminum weld pool 70.

Figure 4:
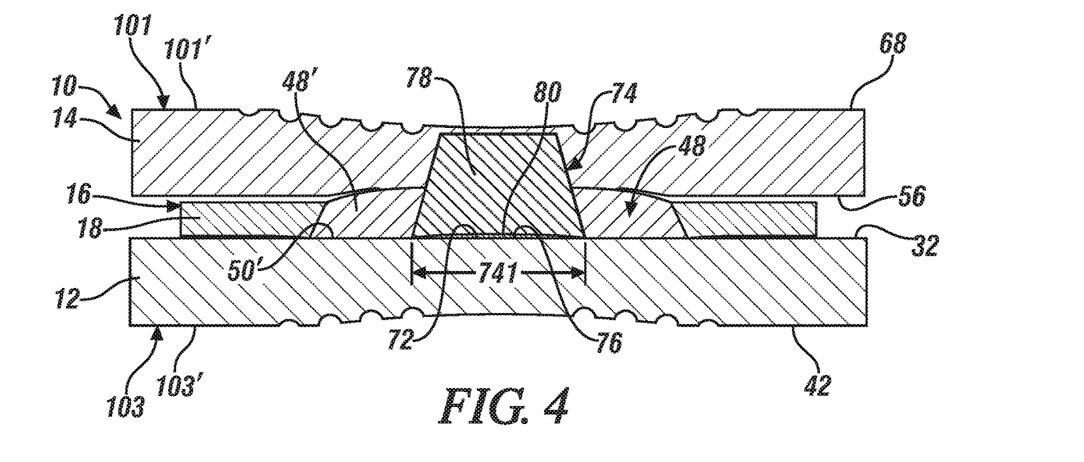
FIG. 4 is an elevated cross-sectional view of the workpiece stack-up depicted in FIG. 3 after the weld joint that bonds the steel and aluminum workpieces together has been formed and the welding electrodes have been removed from the stack-up according to one embodiment of the present disclosure.

The molten aluminum weld pool 70 grows and is contained within the aluminum workpiece 14 and the supporting weld joint 48 of the aluminum shim 18. The molten aluminum weld pool 70 consumes an interior portion of the bonding interface 50 between the supporting weld joint 48 and the faying surface 32 of the steel workpiece 12 and wets a corresponding exposed portion 72 of the faying surface 32. The molten aluminum weld pool 70 penetrates entirely through the aluminum shim 18 within the supporting weld joint 48 and penetrates a distance into the aluminum workpiece 14 that ranges from 10% to 100%, or more preferably from 20% to 80%, of the thickness 141 of the aluminum workpiece 14. As such, the molten aluminum weld pool 70 is surrounded by an unconsumed portion 48' of the supporting weld joint 48, which in turn has had its original bonding interface 50 reduced to a peripheral bonding interface 50' with the faying surface 32 of the steel workpiece 12 that surrounds the exposed portion 72 of the faying surface 32. The enclosure of the molten aluminum weld pool 70 by the unconsumed portion 48' of the supporting weld joint 48 is assisted by the ability of the aluminum shim 18 to readily deform between the steel and aluminum workpieces 12, 14 due to its relatively low strength. The passage of the second electric current between the weld faces 64, 66 of the first and second welding electrodes 60, 62 is eventually terminated, thereby allowing the molten aluminum weld pool 70 to solidify into a weld joint 74 that bonds the aluminum workpiece 14 to the steel workpiece 12 through the aluminum shim 18, as depicted in FIG. 4.

The weld joint 74 establishes a bonding interface 76 with the exposed portion 72 of the faying interface 32 of the steel workpiece 12. The bonding interface 76 of the weld joint 74 that extends from the steel workpiece 12, through the aluminum shim 18, and into the aluminum workpiece 14 is thus surrounded by the peripheral bonding interface 50' of the unconsumed portion 48' of the supporting weld joint 48. The weld joint 74 includes an aluminum weld nugget 78 and an Fe—Al intermetallic layer 80. The aluminum weld nugget 78 is comprised of resolidified aluminum from the supporting weld joint 48 of the aluminum shim 18 and the aluminum workpiece 14. The aluminum weld nugget 78 is surrounded by the unconsumed portion 48' of supporting weld joint 48 within the aluminum shim 18, and further extends into the aluminum workpiece 14 to a distance that ranges from 10% to 100%, or more narrowly from 20% to 80%, of the thickness 141 of the aluminum workpiece 14. The Fe—Al intermetallic layer 80 is situated between the aluminum weld nugget 78 and the exposed portion 72 of the faying surface 32 of the steel workpiece 12 and is contiguous with the bonding interface 76 of the weld joint 74. The Fe—Al intermetallic layer 80 may include $FeAl_3$ compounds, $Fe_2Al_5$ compounds, and possibly other Fe—Al intermetallic compounds, similar to before, and typically has a thickness that ranges from 0.5 µm to 10 µm. The weld joint 74 has a diameter 741 at the bonding interface 76 that is less than the diameter 481 of the supporting weld joint 48 at its bonding interface 50 or 50'. The diameter 741 of the weld joint 74 may range, for example, from 3 mm to 12 mm, or more narrowly from 4 mm to 8 mm at the bonding interface 76.

After spot welding is completed, and the weld joint 74 is formed so as to bond the steel and aluminum workpieces 12, 14 together as described above, the clamping force imposed by the first and second welding electrodes 60, 62 is relieved and the electrodes 60, 62 are retracted away from their respective sides 101, 103 of the workpiece stack-up 10. The workpiece stack-up 10 may now be moved relative to the weld gun (not shown) that carries the welding electrodes 60, 62 so that the first and second welding electrodes 60, 62 are positioned in facial alignment at another weld location 58, which may or may not include an intervening aluminum shim 18, and spot welding is conducted at that location. Or, rather than undergoing spot welding at a different weld location 58, the workpiece stack-up 10 may be moved away from the weld gun to make room for another workpiece stack-up 10. Once the workpiece stack-10 has been spot welded at all of its designated weld locations 58, the stack-up 10 may be further processed, if desired, which may involve painting, shaping, and/or attaching additional components to the workpiece stack-up 10 or attaching the stack-up 10 to a larger article of manufacture.

Figure 5:
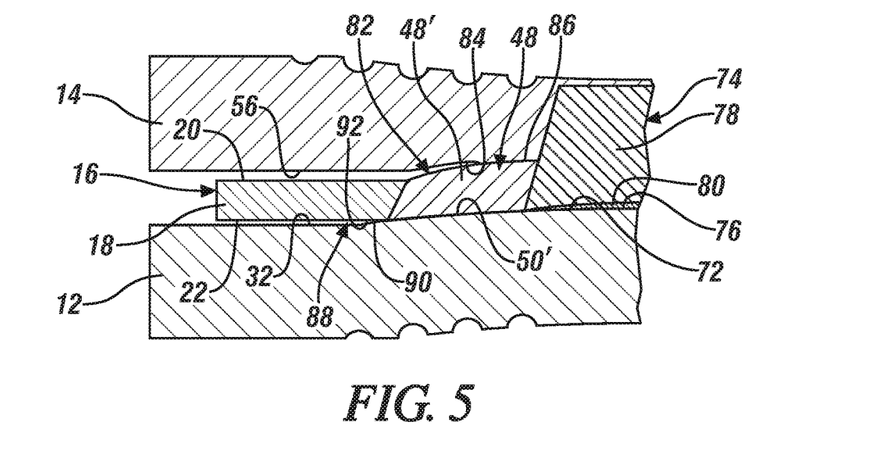
FIG. 5 is a partial magnified cross-sectional view of the workpiece stack-up depicted in FIG. 4 showing a notch root that has been created around the weld joint between the aluminum shim and the aluminum workpiece according to one embodiment of the present disclosure.

The formation of the weld joint 74 through the supporting weld joint 48 of the aluminum shim 18 creates a notch root 82 between the aluminum shim 18 and the aluminum workpiece 14, as illustrated best in FIG. 5. As shown, the notch root 82 is adjacent to, and surrounds, the weld joint 74, and is displaced away from the faying surface 32 of the steel workpiece 12. The notch root 82 includes a notch root opening 84 and a notch root slit 86. The notch root opening 84 is a gap of limited radial expanse that separates the faying surface 56 of the aluminum workpiece 14 and the first facial surface 20 of the aluminum shim 18 outside of the weld joint 74. This gap is formed as a consequence of the high clamping pressure imposed on aligned sections of the first and second sides 101, 103 of the workpiece stack-up 10 by the opposed first and second welding electrodes 60, 62 during passage of the second electric current. The notch root slit 86 is located radially inward of the notch root opening 84 and is directly adjacent to the weld joint 74. The notch root slit 86 is a non-bonded hydraulically sealed interface between the abutting surfaces 56, 20 of the aluminum workpiece 14 and the aluminum shim 18.

A notch root 88 is also created between the aluminum shim 18 and the steel workpiece 12. This notch root 88 resides laterally outside of the notch root 82 created between the aluminum shim 18 and the aluminum workpiece 14 and, consequently, is located farther away from a centerline (extending parallel to the thickness 181 of the shim 18) of the weld joint 74 than the notch root 82 created between the aluminum shim 18 and the aluminum workpiece 14. Specifically, the notch root 88 created between the aluminum shim 18 and the steel workpiece 12 is adjacent to, and surrounds, the unconsumed portion 48' of the supporting weld joint 48. The notch root 88 includes a notch root slit 90 and a notch root opening 92. The notch root opening 92 is a gap of limited radial expanse that separates the second facial surface 22 of the aluminum shim 18 and the faying surface 32 of the steel workpiece 12, and the notch root slit 90 is located radially inward of the notch root opening 92 directly adjacent to the supporting weld joint 74. The notch root slit 90 is a non-bonded hydraulically sealed interface between the abutting surfaces 22, 32 of the aluminum shim 18 and the steel workpiece 12.

The peripheral bonding interface 50' established between the unconsumed portion 48' of the supporting weld joint 48 and the faying surface 32 of the steel workpiece 12 isolates the inwardly enclosed bonding interface 76 established between the weld joint 74 and the exposed portion 72 of the faying interface 32. This protects that bonding interface 76 of the weld joint 74 and its contiguous Fe—Al intermetallic layer 80 against crack formation and propagation when the joint 76 experiences loading by applying forces to the steel and aluminum workpieces 12, 14. Indeed, when forces are applied to the workpieces 12, 14, the resultant stress tends to be diverted to the notch root 82, which encircles the relatively tough aluminum weld nugget 78 of the weld joint 76 where crack initiation and propagation are more deterred—and less damaging if they do occur—compared to the Fe—Al intermetallic layer 80. The weld joint 74 is thus better equipped to withstand loading on account of the creation of the notch root 82 away from the faying surface 32 of the steel workpiece 32 and the capacity to divert stress thereto. In fact, the notch root 82 is located closest to the center of the weld joint 74 and, in this embodiment, is the only one that is adjacent to and surrounds the weld joint 74 since the peripheral bonding interface 50' of the unconsumed portion 48' of the supporting weld joint 48 essentially precludes the creation of a notch root between the aluminum shim 18 and the steel workpiece 12 inside of the supporting weld joint 48. Due to its location closest to the weld joint 74, the notch root 82 created between the aluminum shim 18 and the aluminum workpiece 14 experiences a greater proportion of the stress that results when forces are applied to the steel and aluminum workpieces 12, 14.

The practice of the present disclosure as it relates to resistance spot welding a workpiece stack-up that includes an intervening aluminum patch 16 between the adjacent facing steel and aluminum workpieces 12, 14 is not necessarily limited to the embodiment shown and described in connection with FIGS. 1-5. For instance, the aluminum patch 16 is not limited to the aluminum shim 18, and, even if the aluminum shim 18 is employed, the adherence of the shim 18 to the steel workpiece 12 by pre-welding is not the only option to create a notch root that is displaced away from the faying surface 32 of the steel workpiece 12, is adjacent to and encircles the aluminum nugget 78 of the weld joint 74, and receives diverted stress during loading of the joint 74 as discussed above. In the following discussion of alternative embodiments, reference numerals that correspond to the reference numerals used in the description of the previous embodiment will be used to identify like elements having like functionality. To that end, the description of aspects of the previously-described embodiment shown in FIGS. 1-5 apply equally to aspects of the following embodiments that are identified with corresponding reference numerals unless specifically described otherwise. Only the material differences in of the alternative embodiments shown in FIGS. 6-9 will be discussed in detail below.

Figure 6:
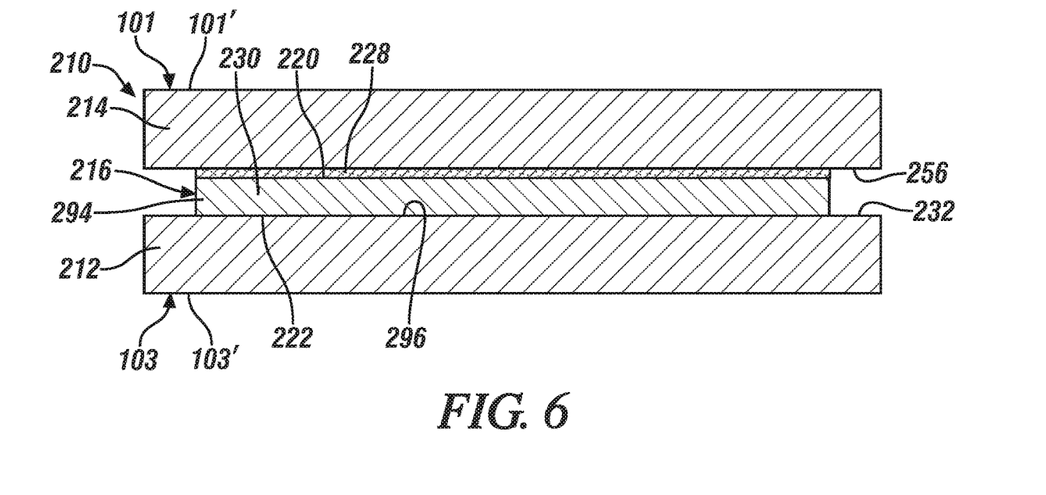
FIG. 6 is an elevated cross-sectional view of a steel workpiece and an aluminum patch in the form of an aluminum coating that has been deposited onto a faying surface of the steel workpiece and is metallurgically bonded thereto according to another embodiment of the present disclosure.

Referring now to FIG. 6, a workpiece stack-up 210 is shown that includes a steel workpiece 212 and an aluminum workpiece 214, as described above, but here the aluminum patch 216 is in the form of an aluminum coating 294 that has been deposited onto the faying surface 232 of the steel workpiece 212. The aluminum coating 294 may be composed of unalloyed aluminum or an aluminum alloy that contains at least 85 wt % aluminum, including any of the various aluminums that may constitute the aluminum substrate of the aluminum workpiece 214. The aluminum coating 294 is deposited onto the faying surface 232 of the steel workpiece 212 in a way that causes the coating 294 to metallurgically bond to the faying surface 232. The aluminum coating 294, which includes a second facial surface 222 that establishes a bonding interface 296 with the faying surface 232 of the steel workpiece 212, typically has a thickness that ranges from 0.05 mm to 1.0 mm. Opposite the second facial surface 222, the aluminum coating 294 has a first facial surface 220 provided by a refractory oxide layer 228 that covers a bulk portion 230 of the coating 294. And while the preferred aluminums for the aluminum coating 294 are more expansive than the preferred aluminums for the pre-welding embodiment discussed above, mainly because pre-welding is not practiced, the use of unalloyed aluminum, an aluminum-manganese alloy that includes up to 1.8 wt % manganese (e.g., 3xxx series wrought aluminum alloy), and an aluminum-silicon alloy that includes up to 15 wt % silicon (e.g., 4xxx series wrought aluminum alloy) are still the most preferred due to their low-strength, relatively thin refractory oxide layer 228, relatively low contact resistance, and their Si and/or Mn content which inhibits Fe—Al intermetallic compound growth.

The aluminum coating 294 may be deposited onto the faying surface 232 of the steel workpiece 212 by a variety of techniques. For example, the aluminum coating 294 may be deposited by thermal spraying, which involves heating a powder or wire of the desired aluminum composition to a semi-molten state and accelerating small droplets of the semi-molten aluminum into the faying surface 232 over a defined area. These small droplets accumulate upon impacting the faying surface 232 to form the aluminum coating 294 to its desired thickness. As another coating option, the aluminum coating 294 may be deposited onto the faying surface 232 of the steel workpiece 212 by cold spraying, which involves accelerating a powder of the desired aluminum composition into the faying surface at a velocity of 500 m/s to 1000 m/s over a defined area. Upon impacting the faying surface 232, the powder particles plastically deform and accumulate to form the aluminum coating 294. Other coating options such as magnetron sputtering or hot-dipping may also be employed to form the aluminum coating 294 onto the faying surface 232 of the steel workpiece 212. Because the aluminum coating 294 is deposited and grown onto the faying surface 232 of the steel workpiece 212, Fe—Al intermetallic compounds do not form at the bonding interface 296 of the aluminum coating 294 and the faying surface 232 of the steel workpiece 212.

Figure 7:
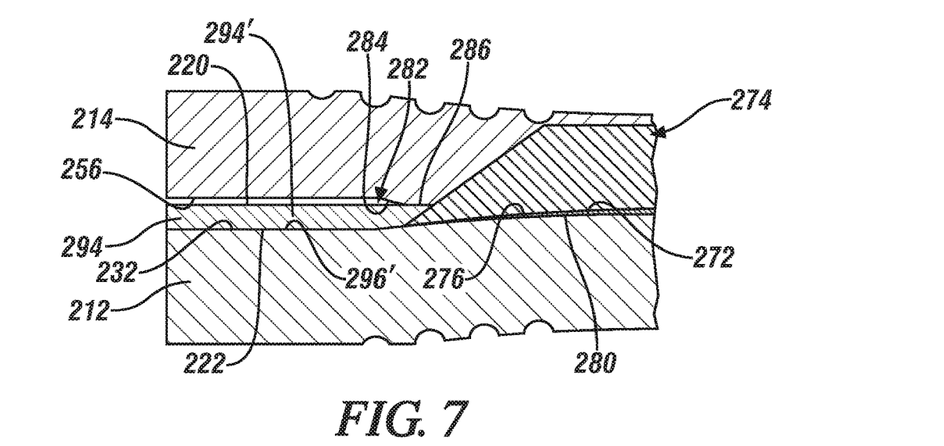
FIG. 7 is a partial magnified cross-sectional view of a workpiece stack-up that includes the steel workpiece and the aluminum coating, as depicted in FIG. 6, along with another aluminum workpiece that is positioned relative to the steel workpiece such that the aluminum coating is disposed between the steel and aluminum workpieces, wherein the workpiece stack-up is illustrated here following spot welding and showing the notch root that has been created around the weld joint between the aluminum coating and the aluminum workpiece.

The aluminum coating 294 functions similarly to the supporting weld joint 50, 150 described in the previous embodiments. Notably, as shown in FIG. 7, the weld joint 274 is formed through the aluminum coating 294 while an interior portion of the coating 294 and its bonding interface 296 with the faying surface 232 of the steel workpiece 212 are consumed in the process. The weld joint 274 establishes a bonding interface 276 with the exposed portion 272 of the faying interface 232 of the steel workpiece 212, which is surrounded by the peripheral bonding interface 296' established between the unconsumed portion 294' of the aluminum coating 294 and the faying surface 232. The formation of the weld joint 274 through the aluminum coating 294 creates a notch root 282 between the aluminum coating 294 and the aluminum workpiece 214. Indeed, as shown, the notch root 282 surrounds the weld joint 274 and is displaced away from the faying surface 232 of the steel workpiece 212, and includes a notch opening 284 that separates the first facial surface 220 of the aluminum coating 290 and the faying surface 256 of the aluminum workpiece 214 as well as a notch root slit 286. In this embodiment, a notch root is not created between the aluminum coating 294 and the steel workpiece 12, mainly because of the good bonding strength between the unconsumed portion 294' of the aluminum coating 294 and the faying surface 232 of the steel workpiece 212 immediately outside of the weld joint 274 at the peripheral bonding interface 296'. The unconsumed portion 294' of the aluminum coating 294 isolates the bonding interface 276 of the weld joint 274 and protects the Fe—Al intermetallic layer 280 of the joint 274 against exposure to crack-inducing stress as previously described.

Figure 8:
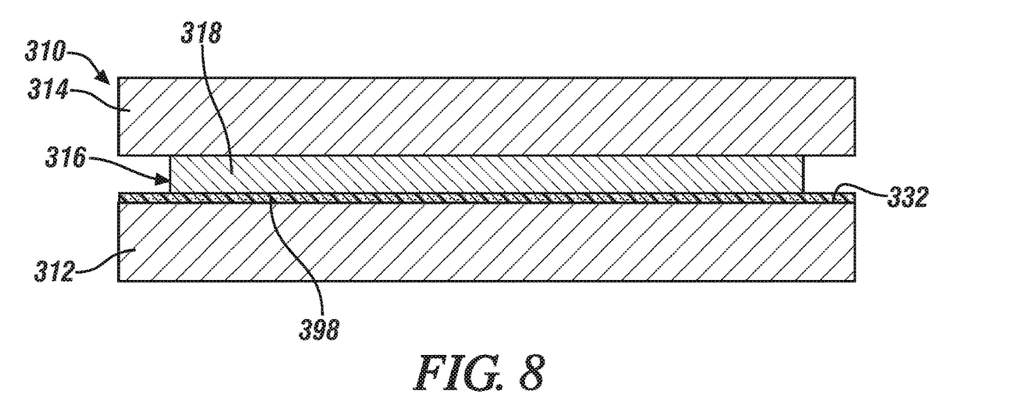
FIG. 8 is an elevated cross-sectional view of a workpiece stack-up that includes a steel workpiece, an aluminum shim adhesively bonded to a faying surface of the steel workpiece by a cured adhesive layer, and an aluminum workpiece positioned relative to the steel workpiece such that the aluminum shim is positioned between the aluminum workpiece and the steel workpiece according to another embodiment of the present disclosure.
Figure 9:
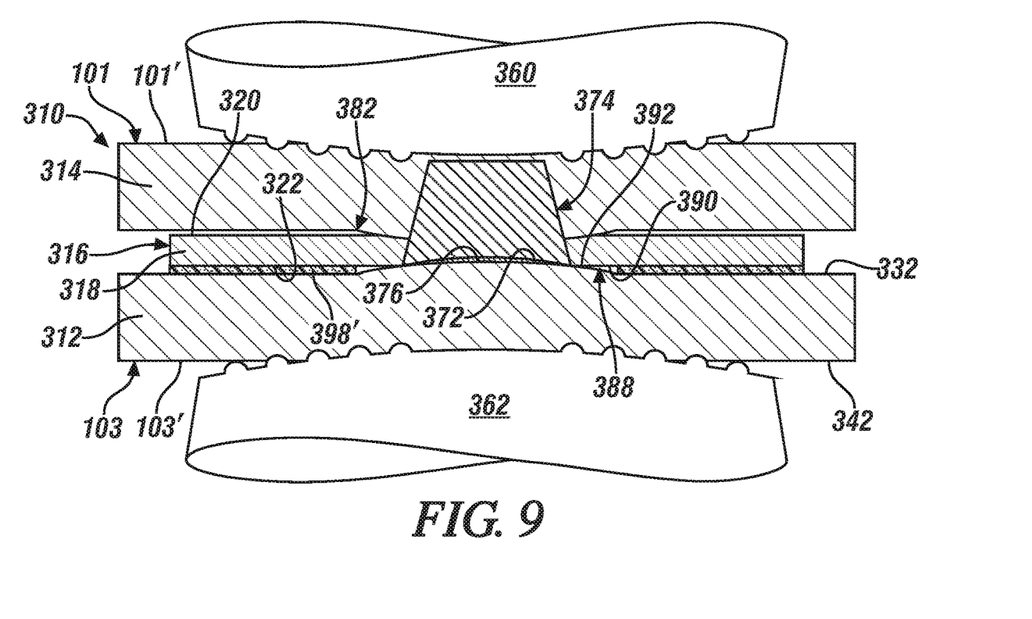
FIG. 9 is a partial magnified cross-sectional view of the workpiece stack-up depicted in FIG. 8 following spot welding and showing the notch root that has been created around the weld joint between the aluminum shim and the aluminum workpiece as well as the notch root that has been created around the weld joint between the aluminum shim and the steel workpiece.

Referring now to FIG. 8, a workpiece stack-up 310 is shown that includes a steel workpiece 312, an aluminum workpiece 314, and an aluminum patch 316 in the form of an aluminum shim 318. In this embodiment, however, the aluminum shim 318 is not pre-welded to the steel workpiece 312, but, rather, is adhesively bonded to the faying surface 332 of the steel workpiece 312 by a cured adhesive layer 398' (FIG. 9). The cured adhesive layer 398' is obtained by curing a curable adhesive layer 398 (FIG. 8) after the weld joint 374 is formed. The curable adhesive layer 398 may comprise a thermosetting polymer adhesive such as heat-curable epoxy or heat-curable polyurethane that may optionally include filler particles, such as silica particles, distributed throughout the polymer adhesive to modify the viscosity profile of the adhesive layer for manufacturing operations. Some specific examples of a thermosetting polymer adhesive include DOW Betamate 1486, Henkel Terokal 5089, and Uniseal 2343, all of which are commercially available. The thickness of the curable adhesive layer 398 as applied and prior to welding of the steel and aluminum workpieces 312, 314 may range from 0.1 mm to 2.0 mm or, more narrowly, from 0.2 mm to 1.0 mm.

To prepare the workpiece stack-up 310, the curable adhesive layer 398 (FIG. 8) is applied to the faying surface 332 of the steel workpiece 312, and the aluminum shim 318 is placed onto the curable adhesive layer 398, which brings the second facial surface 320 of the aluminum shim 318 into contact with the curable adhesive layer 398. Then, during formation of the weld joint 374, the curable adhesive layer 398 is expelled laterally by the clamping pressure of the first and second welding electrodes 360, 362 and any remaining adhesive material at that same interface is thermally decomposed. The weld joint 374 is formed through the aluminum shim 318 and establishes a bonding interface 376 with the exposed portion 372 of the faying interface 332 of the steel workpiece 312. After the weld joint 374 is formed, the surrounding portion of the curable adhesive layer 398 that remains between the second facial surface 322 of the aluminum shim 318 and the faying surface 332 of the steel workpiece 312 is cured in a bake oven or other heating device to produce the cured adhesive layer 398'.

The formation of the weld joint 374 creates the notch root 382 between the aluminum shim 318 and the aluminum workpiece 314, as before, and also creates a notch root 388 between the aluminum shim 318 and the steel workpiece 312 since the curable adhesive layer 398 is ejected from and thermally decomposed in the area where the weld joint 374 is formed. The notch root 388 between the aluminum shim 318 and the steel workpiece 312 includes a notch root opening 390 and a notch root slit 392, as before with the pre-welding embodiment described in connection with FIGS. 1-5. Here, however, the notch root 388 is adjacent to, and surrounds, the weld joint 374, but is still located laterally outside of and farther away from the weld joint 374 than the notch root 382 created between the aluminum shim 318 and the aluminum workpiece 314 due to the tapered shape of the weld joint 374. The notch root 388 created between the aluminum shim 318 and the steel workpiece 312 is not overly problematic—and in fact stress can still be diverted to the other notch root 382 for the reasons described above—since cured adhesive layer 398' surrounds the weld joint 374 and, in particular, the bonding interface 376 established between the weld joint 374 and the exposed portion 372 of the faying surface 332 of the steel workpiece 312. The adhesive bonding between the second facial surface 322 of the aluminum shim 318 and the faying surface 332 of the steel workpiece outside of the weld joint 374 and the notch root 388 created between the aluminum shim 318 and the steel workpiece 312 is sufficient to protect and keep the notch root 388 located at the base of the weld joint 374 intact while diverting stress to the other notch root 382.

The above description of preferred exemplary embodiments and specific examples are merely descriptive in nature; they are not intended to limit the scope of the claims that follow. Each of the terms used in the appended claims should be given its ordinary and customary meaning unless specifically and unambiguously stated otherwise in the specification.

What is claimed is:

1. A method of resistance spot welding a workpiece stack-up that includes a steel workpiece and an aluminum workpiece, the method comprising:

pre-welding an aluminum patch to a faying surface of a steel workpiece to form a supporting weld joint within the aluminum shim that establishes a bonding interface with the faying surface of the steel workpiece;

positioning an aluminum workpiece over the aluminum patch and the steel workpiece to assemble a workpiece stack-up in which the aluminum patch is disposed between a faying surface of the aluminum workpiece and the faying surface of the steel workpiece, the workpiece stack-up having a first side and an opposite second side, the first side being provided by an aluminum workpiece surface and the second side being provided by a steel workpiece surface;

pressing a weld face of a first welding electrode against the first side of the workpiece stack-up;

pressing a weld face of a second welding electrode against the second side of the workpiece stack-up in facial alignment with the weld face of the first welding electrode;

passing an electric current between the weld face of the first welding electrode and the weld face of the second welding electrode to create a molten aluminum weld pool that penetrates through the aluminum patch and into the aluminum workpiece, the molten aluminum weld pool consuming a portion of the aluminum patch to wet an exposed portion of the faying surface of the steel workpiece; and terminating passage of the electric current so that the molten aluminum weld pool solidifies into a weld joint that bonds the aluminum workpiece to the steel workpiece through the aluminum patch, the weld joint establishing a bonding interface with the exposed portion of the faying surface of the steel workpiece, and wherein a notch root is created between the aluminum workpiece and the aluminum patch and is displaced away from the faying surface of the steel workpiece, wherein the notch root includes a notch root opening and a notch root slit, the notch root opening being a gap of limited radial expanse that separates the faying surface of the aluminum workpiece and the aluminum patch outside of the weld joint, and the notch root slit is located radially inward of the notch root opening and is directly adjacent to the weld joint, the notch root slit being a non-bonded hydraulically sealed interface between abutting surfaces of the aluminum workpiece and the aluminum patch, and wherein the molten aluminum weld pool penetrates through the supporting weld joint such that, upon solidifying, the resultant weld joint is surrounded by an unconsumed portion of the supporting weld joint, and wherein a bonding interface established between the weld joint and an exposed portion of the faying surface of the steel workpiece is surrounded by a bonding interface established between the unconsumed portion of the supporting weld joint and the faying surface of the steel workpiece outside of the weld joint.

2. The method set forth in claim 1, wherein the aluminum patch is comprised of unalloyed aluminum, an aluminum-manganese alloy that includes up to 1.8 wt % manganese, or an aluminum-silicon alloy that includes up to 15 wt % silicon.

3. The method set forth in claim 1, wherein the aluminum patch is an aluminum shim that has a first facial surface and an opposed second facial surface, and wherein adhering the aluminum shim to the steel workpiece comprises pre-welding the aluminum shim to the steel workpiece, the pre-welding forming a supporting weld joint that bonds the aluminum shim to the steel workpiece.

4. The method set forth in claim 3, wherein the aluminum shim is comprised of unalloyed aluminum, an aluminum-manganese alloy that includes up to 1.8 wt % manganese, or an aluminum-silicon alloy that includes up to 15 wt % silicon.

5. The method set forth in claim 1, wherein a second notch root is created between the aluminum patch and the steel workpiece outside of and adjacent to the supporting weld joint, the second notch root disposed laterally outside of the notch root created between the aluminum patch and the aluminum workpiece and consequently, located farther away from a centerline, extending parallel to a thickness of the aluminum patch, of the weld joint than the notch root created between the aluminum patch and the aluminum workpiece, wherein the second notch root is adjacent to, and surrounds, the unconsumed portion of the supporting weld joint, and wherein the second notch root includes a second notch root slit and a second notch root opening, the second notch root opening being a gap of limited radial expanse that separates the aluminum patch and the faying surface of the steel workpiece, and the second notch root slit located radially inward of the second notch root opening directly adjacent to the supporting weld joint, and wherein the second notch root slit is a non-bonded hydraulically sealed interface between abutting surfaces of the aluminum patch and the steel workpiece.

6. The method set forth in claim 1, wherein an outer exterior surface of the steel workpiece constitutes the steel workpiece surface at the second side of the workpiece stack-up, and wherein an outer exterior surface of the aluminum workpiece constitutes the aluminum workpiece surface at the first side of the workpiece stack-up.

7. A method of resistance spot welding a workpiece stack-up that includes a steel workpiece and an aluminum workpiece, the method comprising:
pre-welding an aluminum shim to a steel workpiece to form a supporting weld joint within the aluminum shim that establishes a bonding interface with a faying surface of the steel workpiece, wherein the supporting weld joint has a diameter less than a diameter of the aluminum shim resulting in welded portion of the aluminum shim and an unwelded portion of the aluminum shim;
positioning an aluminum workpiece over the aluminum shim and the steel workpiece to assemble a workpiece stack-up in which the aluminum shim is disposed between a faying surface of the aluminum workpiece and the faying surface of the steel workpiece, the workpiece stack-up having a first side and an opposite second side, the first side being provided by an aluminum workpiece surface and the second side being provided by a steel workpiece surface;
pressing a weld face of a first welding electrode against the first side of the workpiece stack-up;
pressing a weld face of a second welding electrode against the second side of the workpiece stack-up in facial alignment with the weld face of the first welding electrode;
passing an electric current between the weld face of the first welding electrode and the weld face of the second welding electrode to create a molten aluminum weld pool that penetrates through the aluminum shim within the supporting weld joint and into the aluminum workpiece, the molten aluminum weld pool consuming a portion of the supporting weld joint, including a portion of the bonding interface of the supporting weld joint, to wet an exposed portion of the faying surface of the steel workpiece; and
terminating passage of the electric current so that the molten aluminum weld pool solidifies into a weld joint that bonds the aluminum workpiece to the steel workpiece through the aluminum shim, the weld joint being surrounded by an unconsumed portion of the supporting weld joint and the unconsumed portion of the supporting weld joint surrounded by the unwelded portion of the aluminum shim and establishing a bonding interface with the exposed portion of the faying surface of the steel workpiece, and wherein a notch root is created between the aluminum workpiece and the aluminum shim and is displaced away from the faying surface of the steel workpiece, wherein the notch root includes a notch root opening and a notch root slit, the notch root opening being a gap of limited radial expanse that separates the faying surface of the aluminum workpiece and the aluminum shim outside of the weld joint, and the notch root slit is located radially inward of the notch root opening and is directly adjacent to the weld joint, the notch root slit being a non-bonded hydraulically sealed interface between abutting surfaces of the aluminum workpiece and the aluminum shim.

8. The method set forth in claim 7, wherein pre-welding the aluminum shim to the steel workpiece comprises:
placing the aluminum shim against the faying surface of the steel workpiece, the aluminum shim having a first facial surface and a second facial surface, the second facial surface contacting the faying surface of the steel workpiece;
pressing a weld face of a first welding electrode against the first facial surface of the aluminum shim;
pressing a weld face of a second welding electrode against an outer exterior surface of the steel workpiece in facial alignment with the weld face of the first welding electrode;
passing an electric current between the weld face of the first welding electrode and the weld face of the second welding electrode and through the steel workpiece and the aluminum shim to create a molten aluminum weld pool within the aluminum shim, the molten aluminum weld pool created within the aluminum shim wetting the faying surface of the steel workpiece; and
terminating passage of the electric current to allow the molten aluminum weld pool created within the aluminum shim to solidify into the supporting weld joint.

9. The method set forth in claim 7, wherein the aluminum shim is comprised of unalloyed aluminum, an aluminum-manganese alloy that includes up to 1.8 wt % manganese, or an aluminum-silicon alloy that includes up to 15 wt % silicon.

10. The method set forth in claim 7, wherein a notch root is created between the aluminum shim and the steel workpiece outside of and adjacent to the supporting weld joint.

11. The method set forth in claim 7, wherein an outer exterior surface of the steel workpiece constitutes the steel workpiece surface at the second side of the workpiece stack-up, and wherein an outer exterior surface of the aluminum workpiece constitutes the aluminum workpiece surface at the first side of the workpiece stack-up.

* * * * *